(12) United States Patent
Akahori (10) Patent No.: US 8,919,814 B2
(45) Date of Patent: Dec. 30, 2014

(54) OPERATION UNIT

(75) Inventor: Hidehiro Akahori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/883,222

(22) PCT Filed: Nov. 9, 2011

(86) PCT No.: PCT/JP2011/075786
§ 371 (c)(1),
(2), (4) Date: May 2, 2013

(87) PCT Pub. No.: WO2012/063851
PCT Pub. Date: May 18, 2012

(65) Prior Publication Data
US 2013/0213784 A1    Aug. 22, 2013

(30) Foreign Application Priority Data

Nov. 9, 2010   (JP) ................................. 2010-251305

(51) Int. Cl.
| | |
|---|---|
| *H01H 9/00* | (2006.01) |
| *H01R 33/955* | (2006.01) |
| *B60Q 1/14* | (2006.01) |
| *B60S 1/08* | (2006.01) |

(52) U.S. Cl.
CPC ............ *H01R 33/955* (2013.01); *B60Q 1/1469* (2013.01); *B60S 1/08* (2013.01)
USPC ..................... 280/771; 200/61.54; 200/61.27; 439/15

(58) Field of Classification Search
USPC ................. 280/771; 200/61.54, 61.27, 61.55, 200/61.56; 439/15, 24, 164
See application file for complete search history.

(56) References Cited

U.S. PATENT DOCUMENTS

| | | | |
|---|---|---|---|
| 3,873,788 A | 3/1975 | Machalitzky et al. | |
| 5,747,763 A * | 5/1998 | Uchiyama et al. ......... | 200/61.54 |
| 5,769,649 A | 6/1998 | Welschholz et al. | |
| 5,847,342 A | 12/1998 | Uchiyama et al. | |

(Continued)

FOREIGN PATENT DOCUMENTS

| | | |
|---|---|---|
| EP | 0 880 205 A2 | 11/1998 |
| EP | 1 205 351 A2 | 5/2002 |

(Continued)

OTHER PUBLICATIONS

International Search Report for PCT/JP2011/075786 dated Feb. 14, 2012.

(Continued)

*Primary Examiner* — Drew Brown
(74) *Attorney, Agent, or Firm* — Kenealy Vaidya LLP (57) ABSTRACT

There is provided a switch unit which is downsized and which can reduce cost by eliminating a connector and an intermediate harness embedded in a body. A wiper switch and a light switch are attached to a steering column. Each of the wiper switch and the light switch includes a base portion which positions a stator portion of the steering column between each other, a housing portion projecting from the base portion along a periphery of the stator portion. A connector is housed in the housing portion. The connector of the wiper switch and the connector of the light switch are attached to the steering column with the connectors being directly connected together.

2 Claims, 5 Drawing Sheets

(56) References Cited

U.S. PATENT DOCUMENTS

| | | | |
|---|---|---|---|
| 5,936,215 A * | 8/1999 | Masuda et al. | 200/61.3 |
| 5,977,494 A * | 11/1999 | Sano et al. | 200/61.54 |
| 5,977,495 A * | 11/1999 | Akimoto | 200/61.54 |
| 6,127,638 A * | 10/2000 | Masuda et al. | 200/61.27 |
| 6,172,314 B1 * | 1/2001 | Uehira et al. | 200/61.54 |
| 6,201,198 B1 | 3/2001 | Takahashi | |
| 6,222,142 B1 * | 4/2001 | Sano | 200/61.54 |
| 6,246,128 B1 * | 6/2001 | Sugata | 307/10.1 |
| 6,462,290 B1 * | 10/2002 | Matsumoto | 200/61.54 |
| 6,501,033 B2 * | 12/2002 | Pastwa et al. | 200/61.27 |
| 6,548,773 B2 * | 4/2003 | Matsumoto et al. | 200/61.54 |
| 7,880,102 B2 * | 2/2011 | Mitsui et al. | 200/61.54 |
| 2002/0056623 A1 | 5/2002 | Matsumoto | |

FOREIGN PATENT DOCUMENTS

| | | |
|---|---|---|
| JP | 10-243277 A | 9/1998 |
| JP | 10-312872 A | 11/1998 |
| JP | 10-321333 A | 12/1998 |
| JP | 11-297434 A | 10/1999 |
| JP | 2002-150864 A | 5/2002 |
| JP | 2003-141972 A | 5/2003 |
| JP | 3518662 B2 | 4/2004 |
| JP | 3637120 B2 | 4/2005 |
| JP | 3678461 B2 | 8/2005 |
| WO | 98/39820 A1 | 9/1998 |

OTHER PUBLICATIONS

Extended European Search Report for the related European Patent Application No. 11840682.6 dated Jul. 7, 2014.

Japanese Office Action for the related Japanese Patent Application No. 2010-251305 dated Jul. 29, 2014.

* cited by examiner

OPERATION UNIT

TECHNICAL FIELD

The present invention relates to an operation unit, specifically to an operation unit including a first operation part and a second operation part by which operation is carried out and a body to which the first operation part and the second operation part are attached.

BACKGROUND ART

A switch unit which is known as the above-mentioned operation unit includes a plurality of lever switches removably attached to a steering column as a body of a vehicle for carrying out operation of a winker and a wiper (refer to Patent Literatures 1-4). By attaching the lever switches in a removable fashion, the lever switch can be replaced easily when the lever switch has broken down.

In recent years, in order to reduce the number of wire harness components in the vehicle, the above-mentioned switch unit has a structure such that the plurality of lever switches is electrically connected to each other, so that a control signal of each lever switch is outputted, in a multiple fashion for example, from an output connector provided at only one lever switch of the plurality of lever switches.

Figure 5:
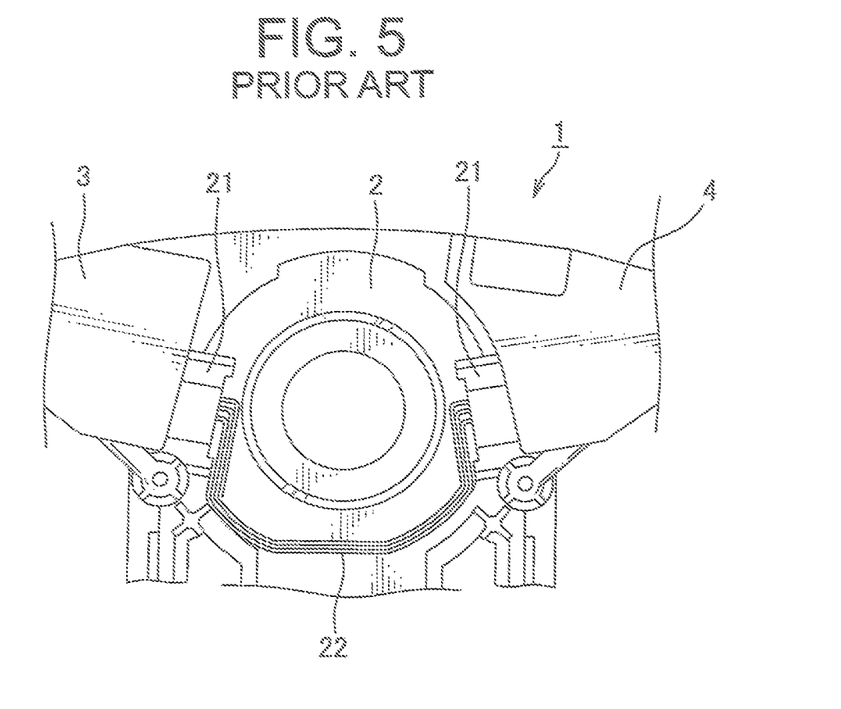
FIG. 5 is a front view of one example of a switch unit which is a conventional operation unit.
Figure 6A:
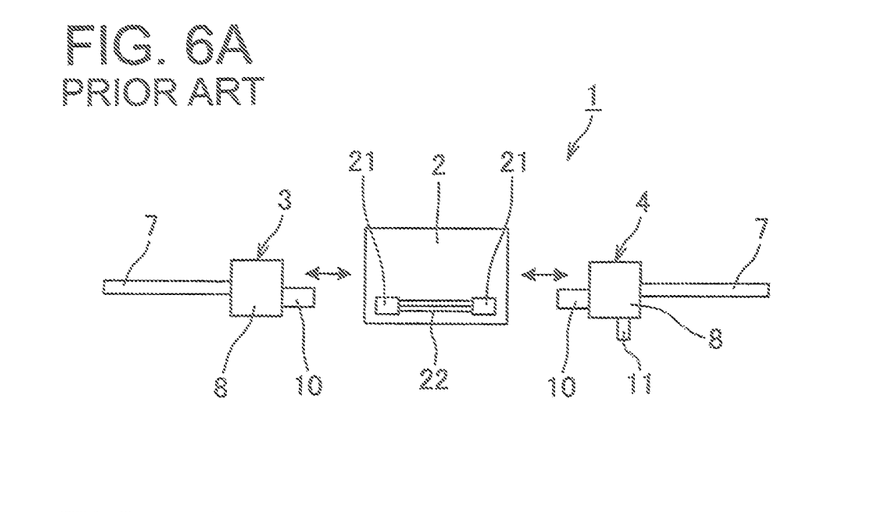
FIG. 6A is a schematic illustration of a configuration of the switch unit shown in FIG. 5 before attaching a wiper switch and a light switch to a steering column.
Figure 6B:
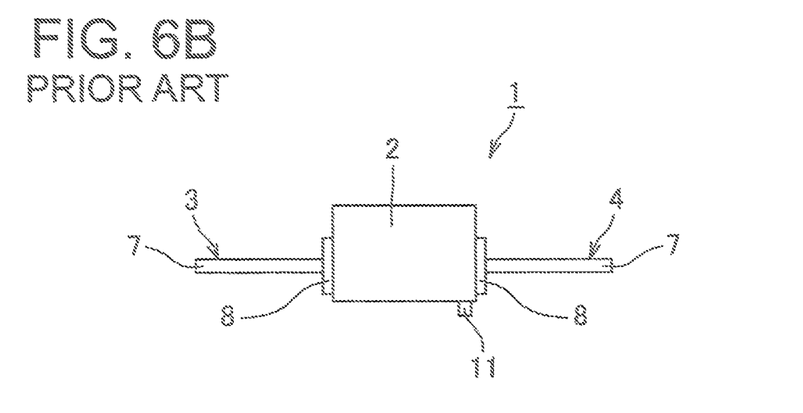
FIG. 6B is a schematic illustration of a configuration of the switch unit shown in FIG. 5 after the wiper switch and the light switch are attached to the steering column.

Examples of such switch unit are shown in FIG. 5 and FIG. 6 (see Patent Literatures 5-7). As shown in FIG. 5 and FIG. 6, a switch unit 1 includes a wiper switch 3 and a light switch 4 as lever switches for carrying out wiper operation and winker operation, and a steering column 2 which rotatably supports a vehicle steering to which the wiper switch 3 and the winker switch 4 are attached.

The above-described wiper switch 3 and the light switch 4 include base portions 8 for positioning the steering column 2 between each other, lever portions 7 projecting from the base portions 8 in directions away from each other, and connectors 10 projecting from the base portions 8 in directions toward each other. The light switch 4 is provided with an output connector 11 for outputting an operation signal when the operation is carried out. The wiper switch 3 is not provided with the output connector 11.

The steering column 2 is embedded with a pair of connectors 21 for connection with the above-mentioned connectors 10, and an intermediate harness 22 for connection between the pair of connectors 21.

However, according to the switch unit 1 described above, there is a need for embedding the pair of connectors 21 and the intermediate harness 22 and such in the steering column, causing an increase in size of the steering column 2. Furthermore, there is a problem concerning the cost, since the connector 21 and the intermediate harness 22 and such embedded in the steering column 2 are required with good quality.

CITATION LIST

Patent Literatures

Patent Literature 1: Japan Patent Application Publication No. H10-321333
Patent Literature 2: Japan Patent Application Publication No. H10-312872
Patent Literature 3: Japan Patent No. 3678461
Patent Literature 4: Japan Patent No. 3518662
Patent Literature 5: Japan Patent No. 3637120
Patent Literature 6: Japan Patent Application Publication No. 2002-150864
Patent Literature 7: International Publication No. WO98/39820

SUMMARY OF INVENTION

Problem to be Solved

An object of the present invention is to provide an operation unit which is downsized and which can reduce cost by eliminating a connector and an intermediate harness embedded in a body.

Solution to Problem

In order to achieve the above-described object, the present invention provides, in a first aspect, an operation unit including a first operation part and a second operation part by which operation is carried out, and a body to which the first operation part and the second operation part are attached, wherein the first operation part and the second operation part are electrically connected to each other so that, when operation is carried out, an operation signal is outputted from an output connector provided to one of the first operation part and the second operation part, wherein the first operation part and the second operation part are provided with connectors, and the connector of the first operation part and the connector of the second operation part are attached to the body with the connectors being directly connected together.

In order to achieve the above-described object, the present invention provides, in a second aspect, the operation unit according to the first aspect, wherein the body is a steering column having a tube portion which rotatably holds a steering of a vehicle, the first operation part and the second operation part include base portions arranged to position the tube portion of the steering column between the base portions, and tube-shaped housing portions projecting from the base portions toward each other along a periphery of the tube portion, and the connector is housed in the housing portion.

In order to achieve the above-described object, the present invention provides, in a third aspect, the operation unit according to the second aspect, wherein one of the housing portion and the body is provided with a guide rib, and another one of the housing portion and the body is provided with a guide groove to which the guide rib is slidably inserted so the guide rib is guided to connect the connectors to each other.

Advantageous Effects of Invention

As explained above, according to the invention described in the first aspect, the first operation part and the second operation part are provided with the connectors, and the connector of the first operation part and the connector of the second operation part are attached to the body with the connectors being directly connected together. Thus, the first operation part and the second operation part can be electrically connected to each other without a connector and an intermediate harness embedded in the body. Consequently, a connector and an intermediate harness embedded in a body can be eliminated, thereby providing the operation unit which is downsized and low in cost.

According to the invention described in the second aspect, the first operation part and the second operation part include base portions arranged to position the tube portion of the steering column between the base portions, and the housing portions projecting from the base portions along the periphery of the tube portion, and the connector is housed in the housing portion. Thus, the connector provided to the first operation part and the connector provided to the second operation part can be connected together in a space-saving manner.

According to the invention described in the third aspect, one of the housing portion and the body is provided with the guide rib, and another one of the housing portion and the body is provided with the guide groove to which the guide rib is slidably inserted so the guide rib is guided to connect the connectors to each other. Thus, the connectors of the first operation part and the second operation part can be connected to each other easily along the guide rib and the guide groove.

DESCRIPTION OF EXEMPLARY EMBODIMENTS

Figure 1:
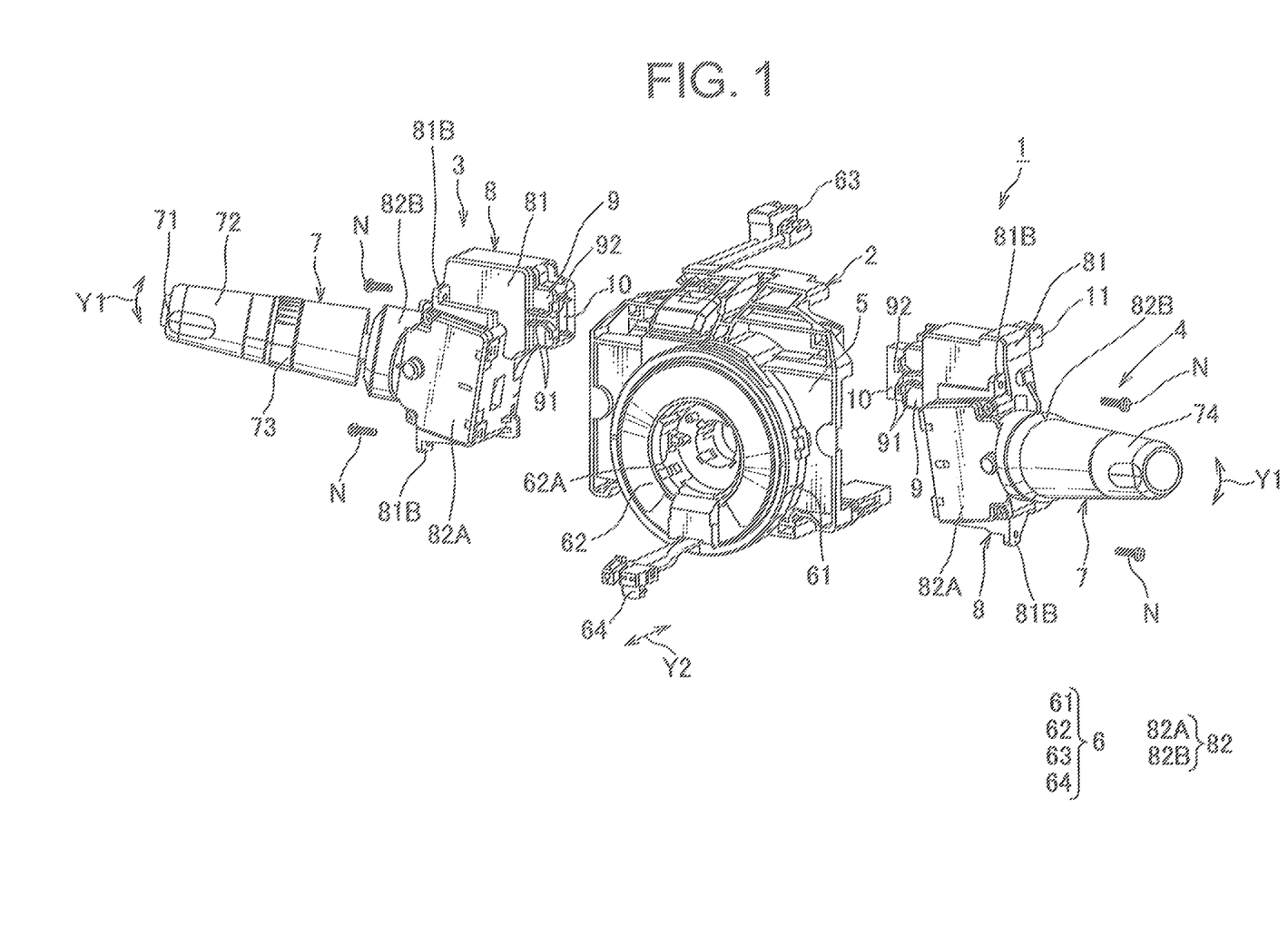
FIG. 1 is an exploded perspective view showing one embodiment of a switch unit as an operation unit of the present invention.
Figure 2:
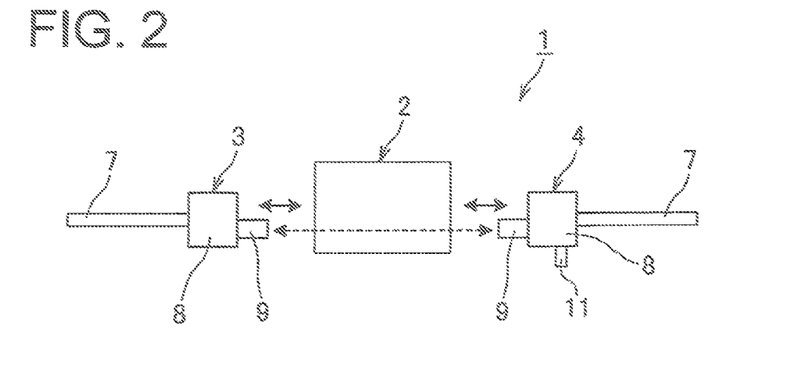
FIG. 2 is a schematic illustration of the switch unit shown in FIG. 1.
Figure 3:
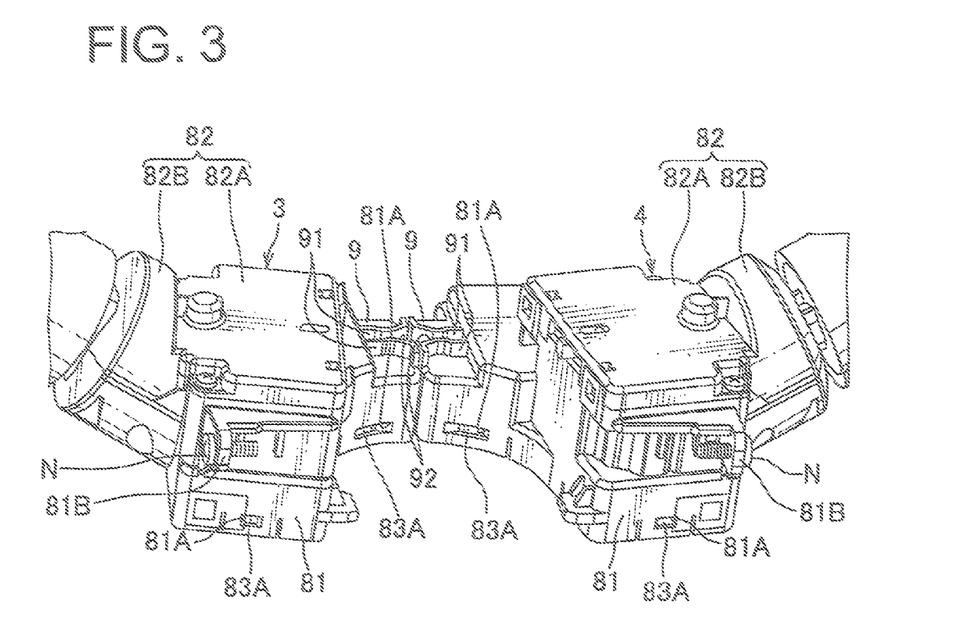
FIG. 3 is a partial perspective view of a wiper switch and a light switch constituting the switch unit shown in FIG. 1.
Figure 4A:
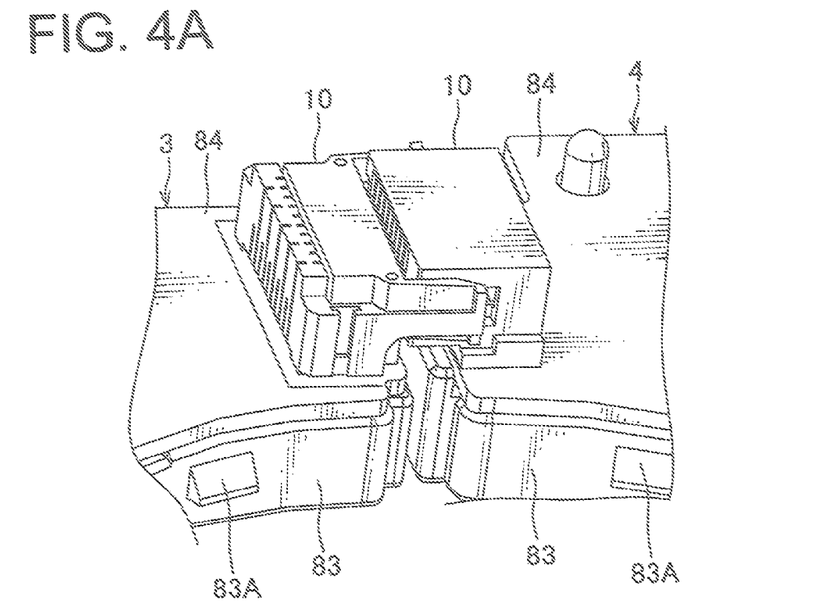
FIG. 4A is a perspective view showing a fitted state of connectors embedded in the wiper switch and the light switch shown in FIG. 1.
Figure 4B:
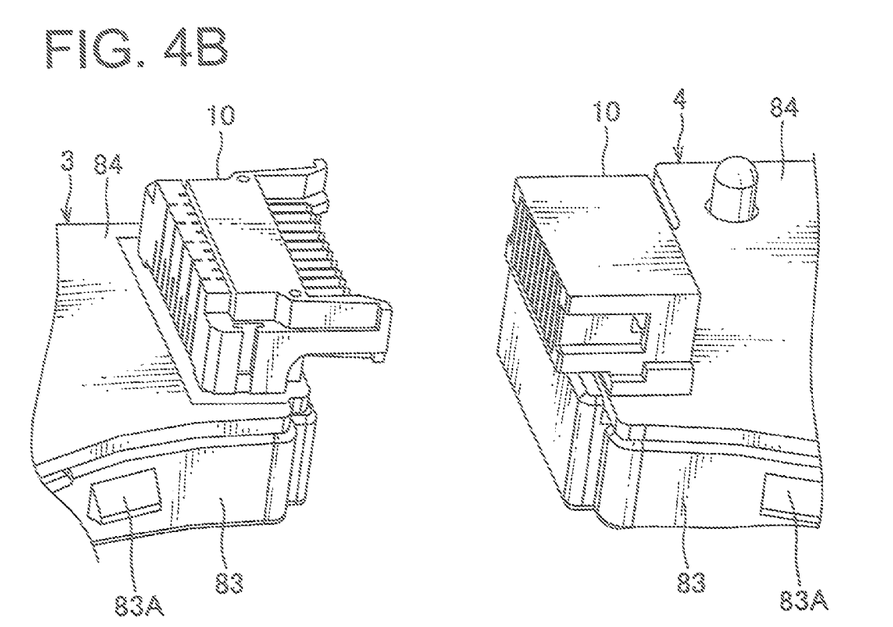
FIG. 4B is a perspective view showing a pre-fit sate of connectors embedded in the wiper switch and the light switch shown in FIG. 1.

In the following, an operation unit according to the present invention is explained in reference to FIGS. 1 through 4. FIG. 1 is an exploded perspective view showing one exemplary embodiment of a switch unit as an operation unit of the present invention. FIG. 2 is a schematic illustration of the switch unit shown in FIG. 1. FIG. 3 is a partial perspective view of a wiper switch and a light switch constituting the switch unit shown in FIG. 1. FIG. 4A is a perspective view showing a fitted state of connectors embedded in the wiper switch and the light switch shown in FIG. 1. FIG. 4B is a perspective view showing a pre-fit sate of connectors embedded in the wiper switch and the light switch shown in FIG. 1. FIGS. 4A and 4B are perspective views with an outer case being removed.

As shown in FIG. 1, for example, a switch unit 1 includes a steering column 2 as a body for holding a steering not shown, and a wiper switch 3 and a light switch 4 as a first operation part and a second operation part which are arranged to be removably attached to the steering column 2.

As shown in FIG. 1, the steering column 2 includes a column body 5 and a rotating connector 6 attached to the column body 5. The column body 5 is made of resin and is supported at an instrumental panel of a vehicle. The rotating connector 6 is a connector arranged to connect a circuit such as an airbag controller fixed on a vehicle body to a circuit such as an airbag inflator fixed to the steering not shown.

the rotating connector 6 includes a stator portion 61 which is a tube-shaped tube portion, a tube-shaped rotor portion 62 rotatably supported in the stator portion 61, a vehicle-side terminal 63 arranged to electrically connect with the circuit fixed on the vehicle body, and a steering-side terminal 64 arranged to electrically connect with the circuit fixed on the steering.

The rotor portion 62 is provided with an insert hole 62A into which the steering not shown is inserted. An inner circumferential wall of the insert hole 62A is provided with an engagement portion which engages with the steering not shown. In this way, the rotor portion 62 rotates in accordance with rotating operation of the steering.

A flexible cable not shown is provided between the stator portion 61 and the rotor portion 62, and the vehicle-side terminal 63 is attached to one end of this cable and the steering-side terminal 64 is provided to the other end of the cable.

The wiper switch 3 is a switch which is operated to control a load of a wiper motor and a washer motor and such of the vehicle. The light switch 4 is a switch which is operated to control a load of a headlight, a small lamp, a fog lamp, a turn-signal lamp and such.

Each of the wiper switch 3 and the light switch 4 includes an elongated rod-like lever portion 7 by which various operations are carried out, a base portion 8 which pivotably supports the lever portion 7 so the lever portion 7 pivots in an arrowed Y1 direction around a proximal end side of the lever portion 7, a housing portion 9 projecting from the base portion 8, a connector 10 housed in the housing portion 9 and arranged to electrically connect the wiper switch 3 and the light switch 4 to each other, and an output connector 11 arranged to output operation signals of both of the wiper switch 3 and the light switch 4 to outside.

The lever portion 7 of the wiper switch 3 includes a push switch 71 arranged at a tip, and a rotating knob 72 and a rotating ring 73 which rotate around an axis of the lever portion 7. The lever portion 7 of the light switch 4 includes a rotating knob 74 at a tip.

The base portions 8 are attached to the steering column 2 such that the stator portion 61 of the steering column 2 is located between the base portions 8. The base portion 8 includes a box-shaped outer case 81 made of resin, a cover 82 made of resin and arranged to cover an opening of the outer case 81, an inner case 83 (FIG. 4) made of resin and arranged to be housed in the outer case 81, and a base plate 84 (FIG. 4) arranged to be attached to the inner case 83 and housed in the outer case 81.

As shown in FIG. 1, the outer case 81 includes an opening located on a front side in an axial direction Y2 of the steering not shown and an opening located on a rear side in the axial direction Y2 of the steering. The outer case 81 further includes an attachment tab 81B projecting therefrom. By placing this attachment tab 81B on the steering column 2 and screwing with a screw N, the wiper switch 3 and the light switch 4 can be attached to the steering column 2. The cover 82 integrally includes a cover body 82A which covers the front side opening of the outer case 81, and a support portion 82B into which the proximal end of the lever portion 7 is inserted and which pivotably supports the lever portion 7.

The inner case 83 is housed in the outer case 81 from the rear side opening of the outer case 81. There is provided a plurality of latch claws 83A (FIG. 3 and FIG. 4) projecting from an outer wall of the inner case 83. When the inner case 83 is inserted in the outer case 81, the latch claw 83A of the inner case 83 is inserted into a latch hole 81A provided to the outer case 81 and/or to the later-described housing portion 9 and latched so that the inner case 83 does not separate from the outer case 81.

As shown in FIG. 4, the base plate 84 is attached to a front side of the inner case 83 and is housed in the outer case 81 together with the inner case 83. The base plate 84 is mounted with an electrical component for outputting an operation signal, which is an electric signal, in accordance with the operation of the lever portion 7.

As shown in FIG. 1 and FIG. 3, the housing portions 9 are arranged to project from the base plates 8 toward each other along a periphery of the stator portion 61. The housing portion 9 is arranged in a tube-like shape, and has one end connected to the outer case 81 and the other end provided with an opening.

A pair of ribs 91 is provided on a periphery of the housing portion 9, and a guide groove 92 is provided between the pair of ribs 91. The guide groove 92 extends in a projecting direction in which the housing portion 9 projects. The guide groove 92 is arranged so a groove width increases toward a tip. To this, the steering column 2 is provided with a guide rib not shown which is arranged to be slidably inserted in the guide groove 92.

The connectors 10 may be selected from a male-type and a female-type which fit together. In this embodiment, the male-type is provided to the wiper switch 3, and the female-type is provided to the light switch 4. Furthermore, the connector 10 is housed in the housing portion 9 and is exposed from the opening in the housing portion 9. For the housing portion 9 of the light switch 4, the connector 10 projecting from the housing portion 9.

The output connector 11 is provided only to the light switch 4 and is not provided to the wiper switch 3. Operational signals of both of the wiper switch 3 and the light switch 4 are outputted from the output connector 11.

Next, an assembling procedure of the switch unit 1 having the above-described structure is explained below. Firstly, the wiper switch 3 and the light switch 4 are moved toward each other so as to position the stator portion 61 of the steering column 2 between the base portions 8 of the wiper switch 3 and the light switch 4. At this time, guide rib (not shown) provided to the steering column 2 is inserted into the guide groove 92 provided to the wiper switch 3 and the light switch 4.

The wiper switch 3 and the light switch 4 are moved further toward each other along the rib of the steering column 2, thereby connecting the connectors 10 of the wiper switch 3 and the light switch 4 to each other. By doing do, the wiper switch 3 and the light switch 4 are electrically connected to each other and the operation signals of both of the wiper switch 3 and the light switch 4 are outputted from the output connector 11.

Also, at this time, the attachment tab 81B of the wiper switch 3 and the light switch 4 are overlapped on the steering column 2. After that, the attachment tab 81B is attached by the screw N, by which the wiper switch 3 and the light switch 4 are attached to the steering column 2 to finish.

According to the switch unit 1 described above, the wiper switch 3 and the light switch 4 are provided with the connector 10, and the connector 10 of the wiper switch 3 and the connector 10 of the light switch 4 are attached to the steering column 2 with the connectors 10 being directly connected together. Thus, the wiper switch 3 and the light switch 4 can be electrically connected to each other without the need of embedding a connector and an intermediate harness in the steering column 2. In this manner, the connector and the intermediate harness to be embedded in the steering column 2 can be eliminated, thereby downsizing and reducing cost.

Furthermore, according to the switch unit 1 described above, the wiper switch 3 and the light switch 4 are provided with the base portions 8 arranged to locate the stator portion 61 of the steering column 2 between each other and the housing portions 9 projecting from the base plates 8 along the periphery of the stator portion 61, and the connector 10 is housed in the housing portion 9. Thus, the connector 10 provided to the wiper switch 3 and the connector 10 provided to the light switch 4 can be connected together in a space-saving manner.

Moreover, according to the switch unit 1 described above, the steering column 2 is provided with the guide rib not shown, and the housing portion 9 is provided with the guide groove 92 into which the guide rib is slidably inserted to guide the connectors 10 to be connected together. Thus, the connectors 10 of the wiper switch 3 and the light switch 4 can be connected together easily along the guide grooves 92.

In the embodiment described above, the steering column 2 is provided with the guide rib not shown, and the housing portion 9 is provided with the guide groove 92. However, the present invention is not limited to this. For example, the steering column 2 may be provided with a guide groove, and the housing portion 9 of the connector 10 may be provided with a guide rib.

The embodiments described herein are only representative embodiment of the present invention, and the present invention is not limited to these. That is, the present invention can be modified in various ways and implemented without departing from the gist of the present invention.

REFERENCE SIGN LIST 1 steering unit (operation unit)
2 steering column (body)
3 wiper switch (first operation part)
4 light switch (second operation part)
8 base portion
9 housing portion
10 connector
11 output connector
61 stator portion (tube portion)
92 guide groove

The invention claimed is:

1. An operation unit comprising
a first operation part and a second operation part by which operation is carried out, and
a body to which the first operation part and the second operation part are attached,
wherein the first operation part and the second operation part are electrically connected to each other, and when operation is carried out, an operation signal is outputted from an output connector provided to one of the first operation part and the second operation part,
wherein the first operation part and the second operation part are provided with connectors, and the connector of the first operation part and the connector of the second operation part are attached to the body with the connectors being directly connected together,
wherein
the body is a steering column having a tube portion which rotatably holds a steering of a vehicle,
the first operation part and the second operation part include base portions arranged to position the tube portion of the steering column between the base portions, and
tube-shaped housing portions projecting from the base portions toward each other along a periphery of the tube portion, and
the connector is housed in the housing portion.

2. The operation unit according to claim 1, wherein
one of the housing portion and the body is provided with a guide rib, and
another one of the housing portion and the body is provided with a guide groove to which the guide rib is slidably inserted so the guide rib is guided to connect the connectors to each other.

\* \* \* \* \*